United States Patent
Lehmeier et al.

(10) Patent No.: US 6,623,119 B2
(45) Date of Patent: Sep. 23, 2003

(54) SYSTEM AND METHOD FOR MODIFYING IMAGE-PROCESSING SOFTWARE IN RESPONSE TO VISUAL TEST RESULTS

(75) Inventors: Michelle R. Lehmeier, Loveland, CO (US); Robert E. Sobol, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 46 days.

(21) Appl. No.: 10/043,986

(22) Filed: Jan. 11, 2002

(65) Prior Publication Data

US 2003/0133076 A1 Jul. 17, 2003

(51) Int. Cl.[7] ................................................. A61B 3/02
(52) U.S. Cl. ...................................................... 351/239
(58) Field of Search ................................ 351/201, 222, 351/223, 224, 239, 240, 242, 243, 246; 345/700, 716, 722, 723

(56) References Cited

U.S. PATENT DOCUMENTS 6,474,817 B1 * 11/2002 McMinnon et al. ......... 351/243
6,543,898 B1 * 4/2003 Griffin et al. ............... 351/243

* cited by examiner

*Primary Examiner*—George Manuel (57) ABSTRACT

A system and method for modifying the sensitivity of various image-editing parameters in accordance with the result obtained from one or more visual-acuity tests are disclosed. The method generally includes the steps of: identifying a new operator of the image-processing system; presenting a visual-acuity test to the operator via an interface to identify a control parameter sensitivity value associated with the operator's visual acuity limit; and adjusting the control parameter sensitivity value accordingly. The method may be implemented by an image-processing system having an image acquisition device, a processor, a memory device, a user-input device, and a display.

20 Claims, 8 Drawing Sheets

SYSTEM AND METHOD FOR MODIFYING IMAGE-PROCESSING SOFTWARE IN RESPONSE TO VISUAL TEST RESULTS

FIELD OF THE INVENTION

The present disclosure relates to image-processing systems. More particularly, a system and method for an improved image-editing application are disclosed.

BACKGROUND OF THE INVENTION

Numerous software applications are commercially available for acquiring, selecting, and editing a digital representation of an image in a number of ways. Frequently, these software applications are configured with a graphical user interface (GUI) suitable for selecting and editing an acquired digital image. For example, to "cut" or delete a portion of the image, the user can use a mouse to select an area of the image by clicking the left mouse button while the screen "cursor" is located on a corner of the image that is desired to be deleted, dragging the screen "cursor" with the mouse to another corner, thereby outlining a portion of interest or the entire acquired image.

After triggering some input command to complete the selection of the region or portion of interest, the operator then completes the "cut" by either selecting the "cut" command from a drop-down menu (using his mouse and/or a keyboard), or alternatively, by using his mouse to select and activate a graphical interface "cut" button or icon. In either case, known image-editing software is invoked which performs the "cut" operation, resulting in the original image being replaced by an edited image which has a blanked-out area enclosed by the boundaries of the region selected.

The aforementioned "cut" operation represents one of the more basic image-editing functions. Commercially available image-editing systems offer a number of operator selectable image-processing parameters that may be applied via known image-editing software to adjust the look of the entire portion of a region of interest. For example, many image-editing systems offer an interface that permits an operator to select various degrees of color saturation. Other common parameters that may be adjusted include: brightness, contrast, and sharpness, etc.

Generally, experienced operators of these commercially available image-editing systems have acquired a knowledge base and understanding of how the selected image will change when the image editor is provided one or more modified imaging parameter values and the image editor modifies the image. On the other hand, inexperienced operators and operators with less visual acuity than the more experienced image-editing system operators, are often frustrated by the control sensitivities provided via the GUI.

For example, some operators may have a limited ability to perceive changes when a color-saturation parameter value associated with a color having a specific range of frequencies. This limited acuity to discern color saturation level changes in a processed image may leave the operator wondering if her last change to the color-saturation level was accepted and applied by the image editor. Similarly, an operator may have trouble discerning contrast adjustments applied by the image editor. Post acquisition image processing is both time and resource intensive. As a result, an inability of the operator to distinguish an image-processing parameter change when it is applied results in an inefficient use of the operator's time, as well as, an inefficient use of the computing resources of the image-processing system in addition to the aforementioned operator frustration.

SUMMARY OF THE INVENTION

From the above, it will be appreciated that it is desirable to provide a system and method for selectively modifying the control sensitivity provided in association with one or more image-processing parameters in an image-editing application. Briefly described, in architecture, an image-processing system capable of modifying control sensitivity values in response to one or more visual-acuity tests can be implemented with a processor, a user command interface, an image display device, a visual acuity logic, an image acquisition device, and an image-processing logic.

Some embodiments of the system can be viewed as providing a method for modifying the control sensitivity of one or more image-processing parameters. In this regard, the method can be summarized by the following steps: identifying when a new operator is processing images with the system; applying one or more visual-acuity tests to determine one or more processing-parameter control-sensitivity values that when applied result in perceivable changes to an edited image; and inserting the one or more processing-parameter control values into the system.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present disclosure generally relates to an automated image-processing system. It will be appreciated that perceptible changes in a processed image may result from the combination of an operator's visual acuity, the type and quality of the of display monitor on which the image is being displayed, as well as, environmental factors that may not be readily adjustable by the operator of the image editor. These and other factors may combine to render an entire range of an operator selectable control parameter as perceptively ineffective. Stated another way, an operator may be presented with an edited or otherwise processed image generated with one or more modified image-editing control parameters that in the eyes of the operator result in no change from the original image when the modified control parameters are applied to the edited image.

Accordingly, the improved image-processing system is configured to test the visual acuity of the operator on the present image-processing equipment before configuring the user interface. In response to the operator's ability to recognize changes between test images generated with different image-processing parameter values, the sensitivity of the respective control is selectively varied. It is significant to note that the figures and associated detailed description that follow present one example of a possible visual-acuity test and a possible control-sensitivity adjustment responsive to the test result. It will be appreciated that a host of visual tests may be presented related to a single visual-acuity measurement. It will also be appreciated that more than one image-editing control-parameter sensitivity value may be adjusted in response to a visual-acuity test. These and other variations are deemed within the scope of the improved image-processing system.

The improved image-processing system may be implemented by integrating the image-editor application with various image acquisition and computing devices. It should be appreciated that the image-editor application may be integrated with a number of various image-acquisition devices and is not limited to integration with a scanner as described in the following figures. When associated with an image scanner, some exemplary applications may include touching up digital representations of color images, photographs, documents, and other similar images.

Figure 1:
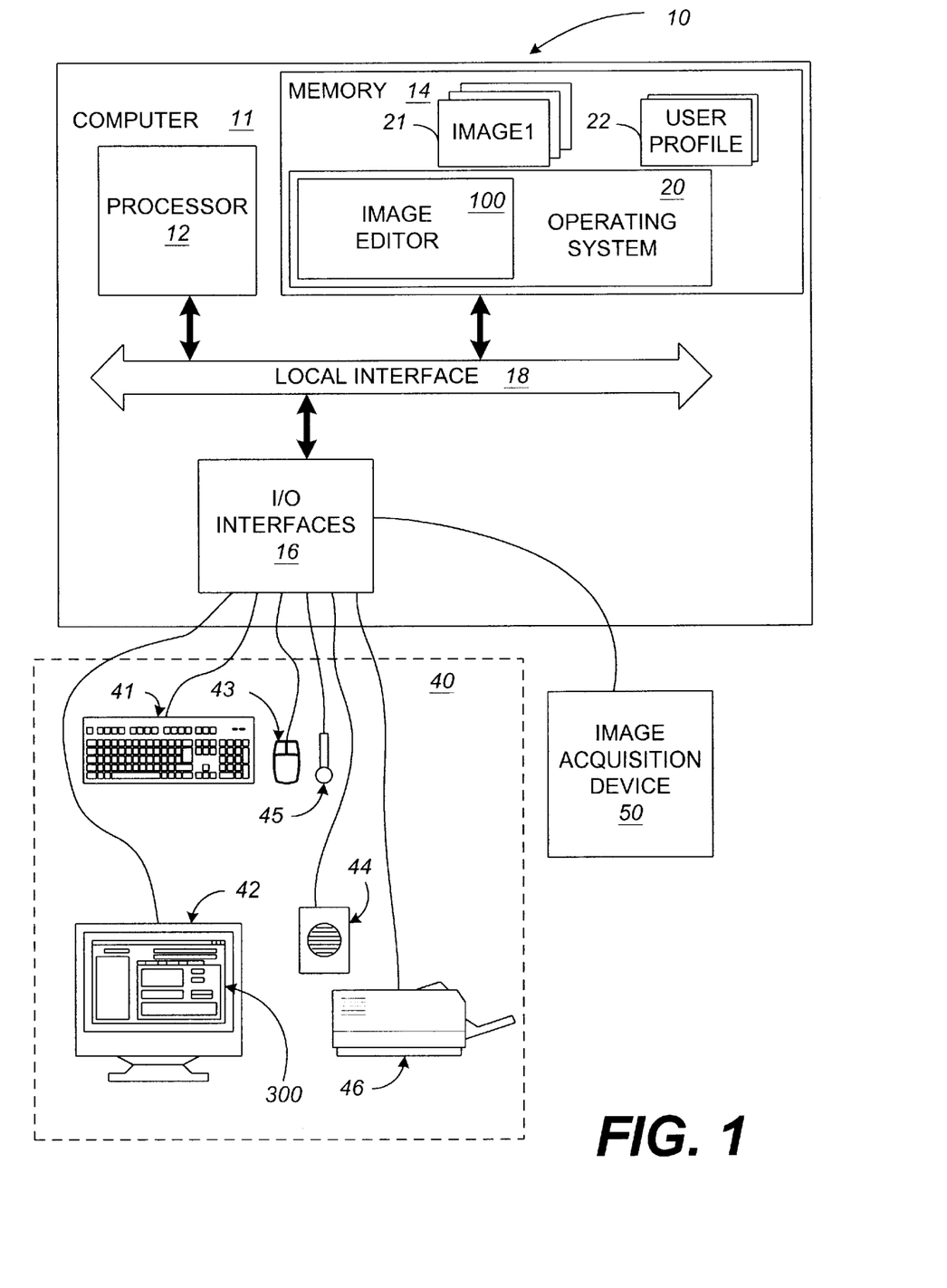
FIG. 1 is a schematic diagram of an embodiment of a computer-based image-processing system.

Referring now in more detail to the drawings, in which like numerals indicate corresponding parts throughout the several views, attention is now directed to FIG. 1, which presents a schematic diagram of a computer-based image-processing system. In this regard, the image-processing system generally denoted by reference numeral 10 consists of a general purpose computer 11, a host of input/output devices 40, and an image-acquisition device 50.

The image-processing system (IPS) 10 includes at least one image-acquisition device 50. The image-acquisition device 50 can be any electronic device capable of developing an electronic image. In the examples described below, the image-acquisition device 50 is a scanner. It should be appreciated that the image-acquisition device 50 may take the form of a digital camera, a video camera, a memory device or any other system capable of transferring a frame of picture elements to the computer 11. The computer 11 may be configured with one or more application programs suited to permit an operator of the IPS 10 to manage and edit a plurality of image files. An image-editor application may be configured to work in cooperation with one or more input devices to selectively edit images.

Those skilled in the art will appreciate that various portions of the IPS 10 can be implemented in hardware, software, firmware, or combinations thereof. In a preferred embodiment, the IPS 10 is implemented using a combination of hardware and software or firmware that is stored in a memory and that is executed by a suitable instruction execution system. If implemented solely in hardware, as in an alternative embodiment, the IPS 10 can be implemented with any or a combination of the following technologies, which are all well known in the art: a discrete logic circuit(s) having logic gates for implementing logic functions upon data signals, an application specific integrated circuit (ASIC) having appropriate combinational-logic gates, a programmable gate array(s) (PGA), a field programmable gate array (FPGA), etc.

Generally, in terms of hardware architecture, as shown in FIG. 1, the computer 11 includes a processor 12, memory 14, and one or more I/O interfaces 16 (or peripheral interfaces) that are communicatively coupled via a local interface 18. The local interface 18 can be, for example but not limited to, one or more buses or other wired or wireless connections, as is known in the art. The local interface 18 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 12 is a hardware device for executing software that can be stored in memory 14. The processor 12 can be any custom made or commercially available processor, a central processing unit (CPU) or an auxiliary processor among several processors associated with the computer 11, and a semiconductor-based microprocessor (in the form of a microchip) or a macro-processor. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 14 can include any one or combination of volatile memory elements (e.g., random access memory (RAM, such as dynamic RAM or DRAM, static RAM or SRAM, etc.)) and nonvolatile memory elements (e.g., read only memory (ROM), hard drive, tape drive, compact disc (CD-ROM), etc.). Moreover, the memory 14 may incorporate electronic, magnetic, optical, and/or other types of storage media. Note that the memory 14 can have a distributed architecture, where various components are situated remote from one another, but can be accessed by the processor 12.

The software in memory 14 may include one or more separate programs and/or data files, each of which comprises an ordered listing of executable instructions for implementing logical functions. In the example of FIG. 1, the software in the memory 14 includes the image editor 100, a suitable operating system 20, a plurality of image files 21, and one or more user profiles 22. A non-exhaustive list of examples of suitable commercially available operating systems 20 is as follows: a Windows operating system from Microsoft Corporation, a Netware operating system available from Novell, Inc., a UNIX operating system, which is available for purchase from many vendors, such as Hewlett-Packard Company and Sun Microsystems, Inc., and a LINUX operating system available from Redhat, among other vendors. The operating system 20 essentially controls the execution of other computer programs, such as the image editor 100, and provides scheduling, input-output control, file and data management, memory management, and communication control and other related services.

The image editor 100 is a source program, executable program (object code), script, or any other entity comprising a set of instructions to be performed. When in the form of a source program the program needs to be translated via a compiler, assembler, interpreter, or the like, which may or may not be included within the memory 14, so as to operate properly in connection with the operating system 20. Furthermore, the image editor 100 can be written as (a) an object-oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The images 21 may be stored in the memory 14 or retrieved from a suitably configured data storage device (not shown) in communication with the processor 12, such as, but not limited to a hard disk drive. The images 21 may be stored in any of a variety of image formats.

The user profile(s) 22 may also be stored in the memory 14, on a remote data storage device or on a hard disk drive associated with the computer 11 (both not shown). The user profile(s) 22 may store a number of user-selectable preferences. These user-selectable preferences may include computing environment parameters such as keyboard type, preferred functions for keyboard function keys, and the like. In addition, the user profile(s) 22 may include one or more "preferred" configuration parameters that may be applied to the image editor 100. The configuration parameters may include such items as control sensitivity values, preferred brightness, contrast, color saturation for red, blue, and green, highlight, mid-tone, shadow, among others. In accordance with preferred embodiments, upon initialization, the image editor 100 searches for the existence of a user profile 22 associated with the present operator of the computer 11. When a user profile 22 exists, the image editor 100 applies the stored configuration parameters when configuring the application. When a user profile does not exist for the present user, the image editor 100 may be configured to set a flag or other indicator that may trigger a query at an appropriate time to determine if the user would like the image editor 100 to store a configuration file for future use.

The I/O devices 40 may include input devices, for example but not limited to, a keyboard 41, a mouse 43, a microphone 45, etc. Furthermore, the I/O devices 40 may also include output devices, for example but not limited to, a display monitor 42, one or more audio speakers 44, a printer 46, etc. Finally, the I/O devices 40 may further include devices that communicate both inputs and outputs, for instance but not limited to, a modulator/demodulator (modem; for accessing another device, system, or network), a radio frequency (RF) or other transceiver, a telephonic interface, a bridge, a router, etc. For simplicity of illustration these aforementioned two-way communication devices are not illustrated.

If the computer 11 is a PC, workstation, or the like, the software in the memory 14 may further include a basic input output system (BIOS) (also omitted for simplicity of illustration). The BIOS is a set of essential software routines that initialize and test hardware at startup, start the operating system 20, and support the transfer of data among the hardware devices. The BIOS is stored in a ROM so that the BIOS can be executed when the computer 11 is activated.

When the computer 11 is in operation, the processor 12 is configured to execute software stored within the memory 14, to communicate data to and from the memory 14, and to generally control operations of the computer 11 pursuant to the software. The image editor 100 and the operating system 20, in whole or in part, but typically the latter, are read by the processor 12, perhaps buffered within the processor 12, and then executed.

When the image editor 100 is implemented in software, as is shown in FIG. 1, it should be noted that the image editor 100 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The image editor 100 can be embodied in any computer-readable medium for use by or in connection with an instruction-execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction-execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CD-ROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

As illustrated in FIG. 1, the computer 11 may be integrated with an image-acquisition device 50. It should be appreciated that the image-acquisition device 50 may take the form of a network connection with suitable bandwidth to receive a digital representation of an image frame. Alternatively, the image-acquisition device 50 may take the form of a storage device interface such as a tape drive, a hard drive or other data storage device having a number of image files stored within the device. In other alternative configurations, the image-acquisition device 50 may take the form of a digital camera, a video camera, a scanner, or other similar device. Whatever the nature of the image-acquisition device 50, the computer 11 works together with the display monitor 42 and the input/output interfaces 16 to reproduce an image that may be viewed, analyzed, and edited by an operator of the image-editor application 100.

Image Editor Architecture and Operation

Figure 2:
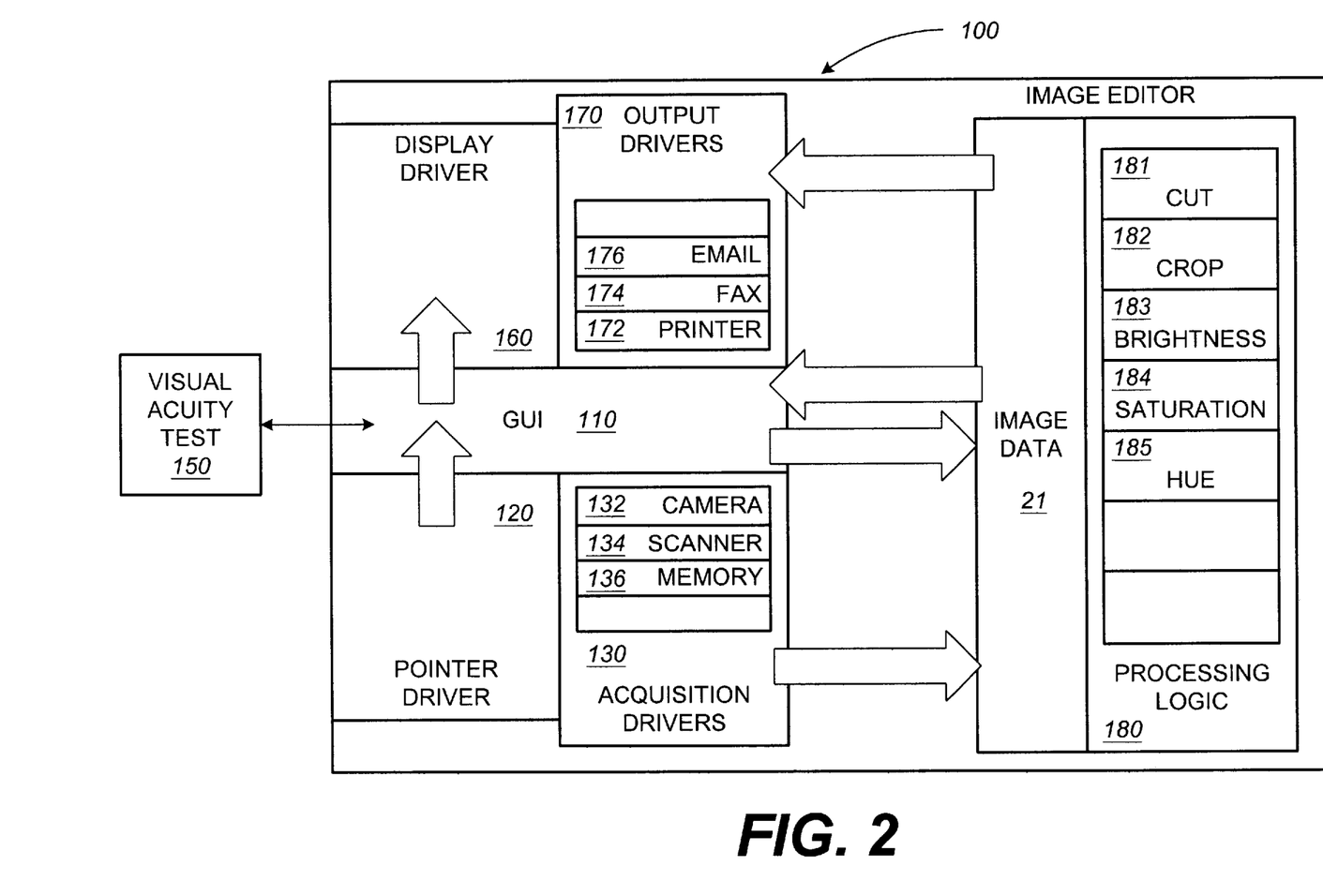
FIG. 2 is a schematic diagram of an image editor application program operative on the image-processing system of FIG. 1.

Reference is now directed to FIG. 2, which presents a schematic diagram of an image-editor application 100 that may be operative on the IPS 10 of FIG. 1. In this regard, the image editor 100 consists of a GUI 110, a pointer (user input) driver 120, a display driver 160, image-acquisition drivers 130, output drivers 170, and image-editing processing logic 180.

As illustrated in FIG. 2, the GUI 110 is in communication with the pointer driver 120 to receive operator directed inputs and the display driver 160 to generate a plurality of graphical representations of operator inputs, a number of processing parameters, as well as, representations of one or more images that may be processed by the image-editor 100. In addition, the GUI 110 is in communication with an image-acquisition driver 130 for receiving image data from one or more image-acquisition devices 50 (FIG. 1). Furthermore, the GUI 110 is in communication with an image output driver 170 suited for receiving and transferring a digital representation of a processed image to a plurality of output devices. As shown in FIG. 2, the aforementioned image-acquisition devices 50 may include a camera, a scanner, and a memory device. The image editor 100 may be configured such that each of the aforementioned image-acquisition devices 50 has an associated driver. For example, the acquisition drivers 130 may include a camera driver 132, a scanner driver 134, and a memory device driver 136 among others. As further illustrated in FIG. 2, the image output driver may be in selective communication with a printer driver 172, a fax driver 174, an E-mail driver 176, as well as, other output device drivers.

As illustrated in the block diagram of FIG. 2, the GUI 110 is also configured to transfer and receive image data 21 (which may be in the form of files) both to and from the processing logic 180. As shown in FIG. 2, the processing logic 180 may contain a number of functional processes such as, but not limited to, cut 181, crop 182, brightness adjustment 183, color saturation adjustment 184, and a color hue adjustment 185.

As further illustrated in FIG. 2, the GUI 110 may be configured to interface with a visual-acuity test 150. As will be described in detail below, the visual-acuity test 150 may be configured to present a plurality of generated test images via a plurality of data entry windows or frames. Preferably, the GUI 110 is itself in the form of a plurality data entry windows or informational frames of image data presented under a standard human machine interface easily recognizable and operable by the operators of the image editor 100. For example, the GUI 110 may take the form of a plurality of application windows each configured with a menu bar and a command bar containing one or more file command push-buttons, and one or more format command push-buttons.

The image editor 100 is preferably programmed to provide a standard computer interface commonly used with image editing and processing programs. Included therein are several functional items that are defined below:

Context-Sensitive Menu—A menu that highlights options as available or unavailable depending upon the context in which the menu is called.

Drop Down Menu—Drops down from menu bar and remains active until closed or an available menu option is selected.

Menu Bar—Bar across top of screen that contains one or more labels which activate an associated drop down menu.

Pull Down Menu—A sub-menu that is typically activated by moving a pointing device over a drop down menu option.

Pop-up Menu—Menu that is activated upon selection of a feature push-button.

Scroll Bar—Bar at side or bottom of screen that allows user to scroll left, right, andlor up, and down through a large window.

An operator of the GUI 110 may configure the image editor 100 to acquire a digital representation of a scanned color photograph by selecting an appropriate image-acquisition mode. The image editor 100 may accomplish the image data acquisition by applying one or more drivers such as the scanner driver 134 to receive the digital information from a scanner integrated with the IPS 10 (FIG. 1). After having acquired the image, the image editor 100 may be configured to present the image data in an interface window via the display monitor 42 (FIG. 1). It will be appreciated that both the image data interface window, as well as the underlying image data may be configured by the display driver 160.

As is known the image editor 100 may permit an operator via the GUI 110 to view and modify image data in a variety of ways. For example, the image editor 100 may be configured to permit an operator to select portions of an image through a well known method of overlaying a pointing device interface driven line over the image information. Once the operator has placed the interface line over that portion of the image that the operator desires to change in some way, the image editor 100 may provide a trigger input that permits an operator to "select" the identified image portion for further processing operations. These processing operations may include, but are not limited to, adjusting the hue, saturation, and luminance of red, green, and blue pixels within the selected image portion. The processing operations may also include adjusting the contrast and brightness, as well as, adjusting highlights, mid-tones, and shadows within the selected image portion. In addition, the image editor 100 may be configured to permit an operator to add identifying information to the image data, such as but not limited to, labels, acquisition data including machine settings, acquisition data related to the subject, and the like.

The image editor 100 may be configured to store one or more operator configurations or image-editing templates. These image-editing templates may be stored within the memory 14 and selectively retrieved from a list of various operator, image source, and/or image type specific image-editing templates that may be applied by the image editor 100 in the acquisition and processing of an image.

As further illustrated in FIG. 2, the processing logic 180 works together with the GUI 110 and the plurality of functions (i.e., cut 181, crop 182, brightness 183, etc.) to generate a modified digital representation of the originally acquired image. Once the operator is satisfied that she has modified the image to her liking, she may configure an output-device select window to select the appropriate output driver 170 to transfer the modified image 300 as it appears on the display monitor 42 (FIG. 1) to a number of external devices. For example, the image 300 may be stored, faxed, displayed, electronically mailed, and or printed by commands generated within the application.

Visual-Acuity Test Operation

Figure 3:
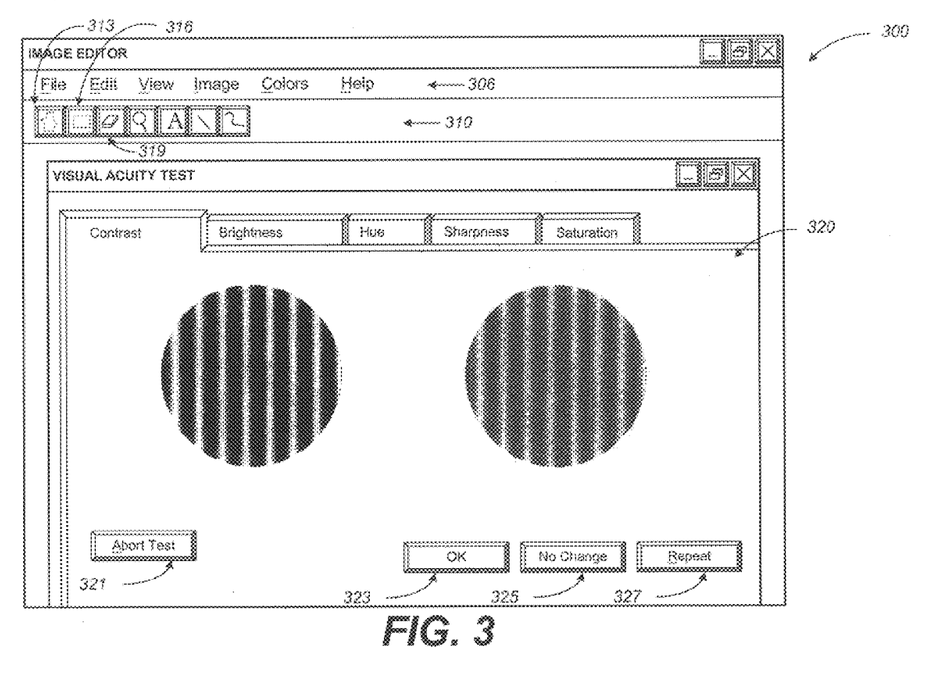
FIG. 3 is a schematic diagram of an exemplary visual-acuity test display that may be presented by the image editor of FIG. 2.

The various functional blocks of the image editor 100 having been introduced and briefly described with regard to the schematic of FIG. 2, reference is now directed to FIGS. 3 through 6, which will illustrate the operation of an exemplary visual-acuity test 150 that may be integrated with the image editor 100. In this regard, FIG. 3 illustrates an exemplary GUI display 300 that may be produced and displayed by the image editor 100 when in a visual-acuity test mode. As shown, the GUI display 300 may contain a window entitled "Image Editor." The "Image Editor" window 300 may have a header menu bar 306. Here, the image editor 100 offers drop down menus entitled, "File," "Edit," "View," "Image," "Colors," and "Help." It will be appreciated that each of the drop-down menus may include a set of further menu options. It should be further appreciated that one or more of each of the menu options associated with each of the header menu bar options may or may not be activated based upon the present state of the GUI 110. In addition to the header menu bar 306, the GUI display 300 may present a second header 310 containing one or more functional pushbuttons labeled with icons indicative of the underlying image-editing function. For example, the GUI display 300 may present a first icon 313 associated with a multi-sided variable image select mode. A second icon 316 may be associated with a rectangular area select mode and a third icon 319 may be associated with an erase mode. It should be appreciated that the image editor 100 may be configured to provide a host of other functional mode pushbuttons. As with the drop-down menus, one or more of the various icon labeled functional pushbuttons may be marked as inactive and in fact inactivated based on the present state of the image editor 100.

As is illustrated in the schematic of FIG. 3, the GUI display 300 may also present a popup window display 320 containing multiple pages each having its own particular interface associated with a different visual-acuity test that may be presented to the operator of the image editor 100. In the exemplary schematic of FIG. 3, the image editor 100 is presenting an image contrast test to the operator via the GUI display 300. The contrast test page of the popup window display 320 may be arranged with a number of functional pushbuttons each associated with a label across the page. As shown the functional pushbuttons may include an "Abort Test" button 321, an "OK" button 323, a "No Change" button 325, and "Repeat" button 327.

As also shown on the page, the operator may be presented with multiple versions of a test image. In order to test an operator's ability to discern processed image changes in an image modified from a first image, a first image is generated using a baseline image-processing parameter value. Here, a first contrast adjustment level is used to generate the leftmost image presented on the GUI display 300. The rightmost image is generated using the same test image using a contrast adjustment level that is a predetermined step or delta from the first. When the operator of the image editor detects a discernable difference in the images presented, the operator may depress the "OK" pushbutton 323 to indicate that she can distinguish a difference between the images. Otherwise, if she could not detect a visible difference in the contrast level between the displayed images, the operator would depress the "No Change" pushbutton to indicate to the image editor that the contrast sensitivity delta was beyond her visual acuity given the present equipment and ambient light. An operator of the IPS 10 may select the "Repeat" pushbutton to direct the image editor 150 to redisplay the various images for one or more cycles. The "Abort Test" pushbutton 321 may be selected at any time during the visual-acuity test to return to a standard image-editing mode that applies default image-processing parameter sensitivity deltas to each of the operator adjustable image-editing controls.

In alternative embodiments, the display may alternatively present the first and second images with each being displayed for a predetermined duration. In this alternative mode, the image editor 150 may be programmed to display each of the images for a set period with display transitions triggered by the passing of the set period. In other embodiments, an audible tone or other indicator may be presented to assist the operator in determining when the display has been modified.

In response to the operator's affirmative response to the underlying query (i.e., can you determine a difference between the displayed images?) presented in the GUI of FIG. 3, the image editor 100 may be configured to respond by varying the sensitivity of the contrast control that will be presented to the operator when the operator returns to an image-editing mode. In preferred embodiments, each image-processing parameter will be adjusted to the finest control sensitivity value that results in an observed difference for the present user of the IPS 10 because of the visual-acuity test.

However, preferred embodiments may present one or more image-processing configuration interfaces that may be used to further adjust one or more image-processing parameters including control sensitivity values. These image-processing configuration interfaces may be used to override the visual-acuity test result sensitivities and/or may be used in lieu of the visual-acuity test when the image editor 100 is being operated by an experienced user.

Figure 4:
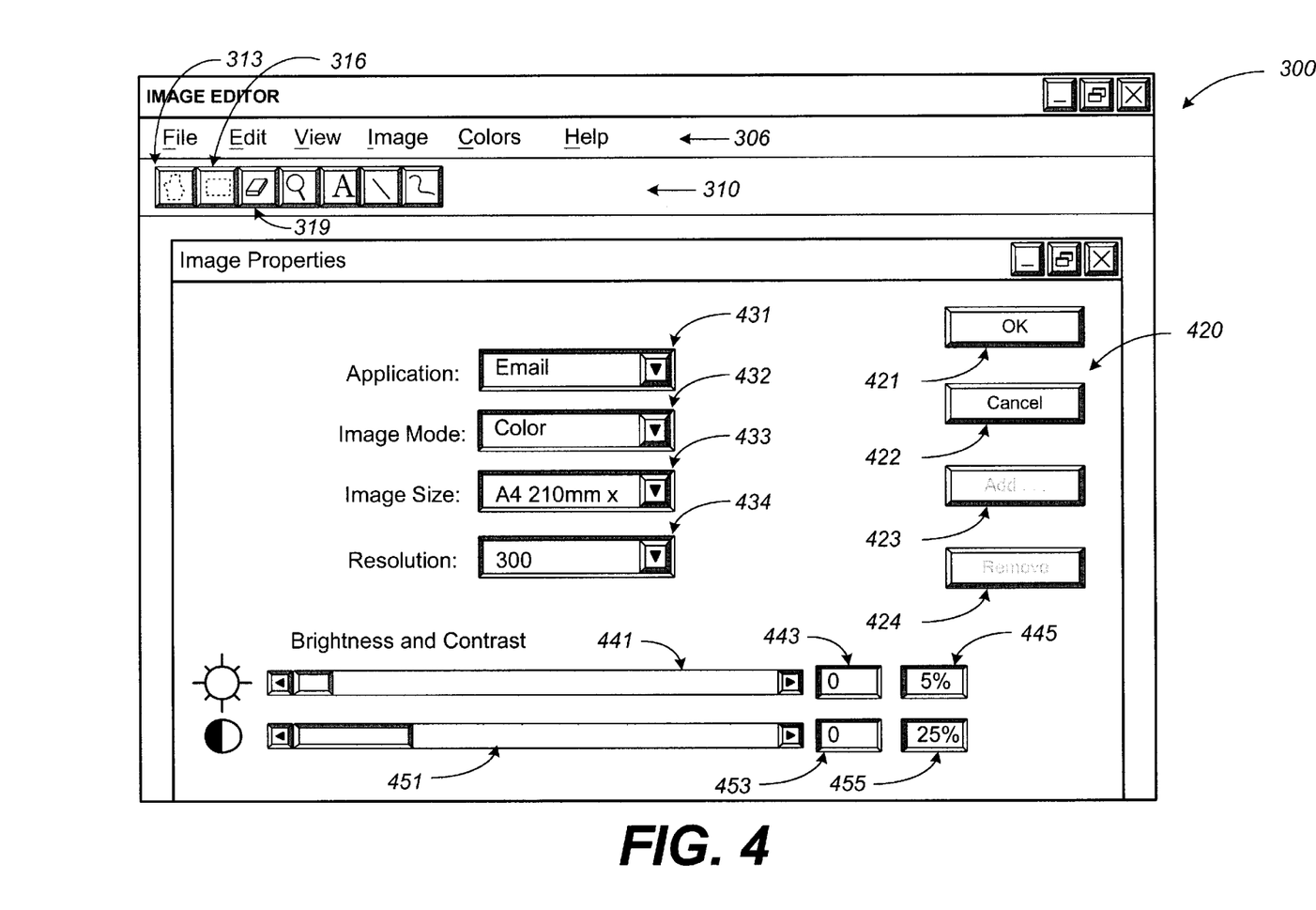
FIG. 4 is a schematic diagram of an exemplary GUI that may be presented by the image editor of FIG. 2.

In this regard, FIG. 4 illustrates an image properties pop-up display 420 that may be generated by the image editor 100. As illustrated the image properties pop-up display 420 may present a host of user configurable options to the operator as well as a host of configuration controls. For example, the image properties pop-up display 420 may present an application interface menu 431, an image-mode menu 432, an image-size menu 433, and an image-resolution menu 434. In addition, the image properties pop-up display 420 may present both a brightness and contrast control interfaces 441, 443, along with "OK" 421, "Cancel" 422, "Add" 423, and "Remove" 424 functional pushbuttons.

As shown in FIG. 4, each of the application-interface menu 431, the image-mode menu 432, the image-size menu 433, and the image-resolution menu 434 may be configured with a pull-down menu arrow pushbutton. Upon individually selecting each of the pull-down menu arrows, the operator will be presented with a menu listing all available selections related to the associated application, image mode, image size, and image resolution, respectively. As is also shown in FIG. 4, the brightness and contrast controls 441, 443 may be similarly presented in the form of a slide bar with each respective slide bar control outfitted with corresponding left and right arrows to adjustably control either the brightness or the contrast value that is applied to the selected image data. Here, the brightness and contrast controls 441, 443 may be further associated with a corresponding absolute brightness value display 443 and an absolute contrast value display 453. As also shown, the brightness and contrast controls 441, 443 may be also associated with a corresponding percentage of full scale brightness display 445 and a percentage of full scale contrast display 455. As shown in FIG. 4, the contrast control sensitivity is in a state that is much coarser than the brightness sensitivity control as is shown by the 25% and 5% values in the corresponding full scale displays 455, 435, respectively.

As is also illustrated in the image properties pop-up display 420 of FIG. 4, the "Add" pushbutton 423 and the "Remove" pushbutton 424 may be in an inactive state as is apparent from their "gray" label. When the operator has selected each of the image-editing variables as desired, the operator may elect to apply the configuration by depressing the "OK" functional pushbutton 421 by positioning a cursor indicative of the relative position of a pointing device input over the pushbutton 421 as displayed on the display monitor 42 and depressing a suitably configured select input trigger.

It is significant to note however that when the image editor 100 is in a visual-acuity test mode, the underlying sensitivity control adjustments that may be applied to the various image-editing windows may be applied in the background. In other words, if the result of the contrast test indicates that the present operator of the image editor 100 is incapable of discerning a visual difference between images generated with a change in contrast control of 8% of the contrast parameter full-scale adjustment. The image editor 100 may be configured to respond by adjusting the sensitivity of the contrast parameter full-scale adjustment to 9% of its full-scale capability. This contrast parameter sensitivity adjustment, in preferred embodiments of the improved image editor 100, will be applied absent further operator feedback. Once the operator has completed the various visual-acuity tests presented by the image editor 100, the image editor will adjust the sensitivity of each of the associated image-editing control parameters as indicated by the visual acuity of the operator.

In accordance with an operator's input indicating that the operator could indeed discern a difference between the images presented in the GUI display 300 of FIG. 3, the image editor 100 may be configured to reduce the delta between the contrast parameter value used to generate the first and second images on the contrast test page of the popup window display 320. It should be appreciated that a number of different processes may be used to select an appropriate image-processing parameter delta reduction. For example, in one mode, the image-processing parameter delta may be adjusted by a factor of two (e.g., a contrast sensitivity may be reduced by ½) as a result of each subsequent test where the operator responds affirmatively (i.e., the operator can detect the change in sensitivity). Regardless of the adjustment process selected or the underlying image-processing parameter associated with a present visual-acuity test, the operator may be prompted multiple times in an iterative process until two test images generated with different image-processing parameter values result in images that the operator can not distinguish as being different. Two such images are presented in FIG. 5.

Figure 5:
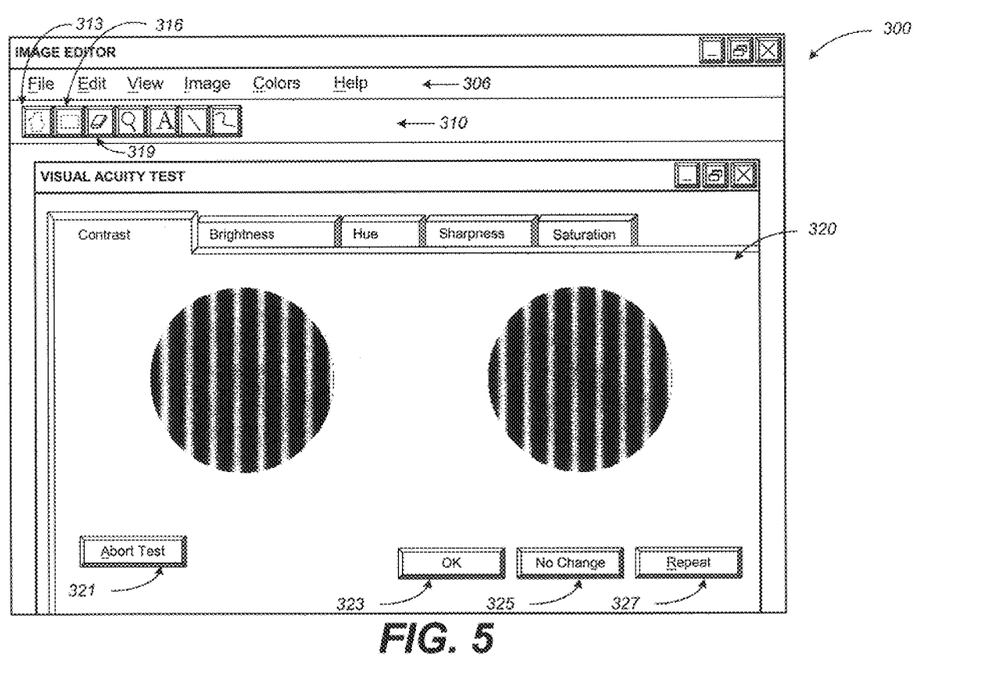
FIG. 5 is a schematic diagram of an exemplary visual-acuity test display that is generated using a different processing parameter value than the display of FIG. 3 that may be presented by the image editor of FIG. 2.
Figure 6:
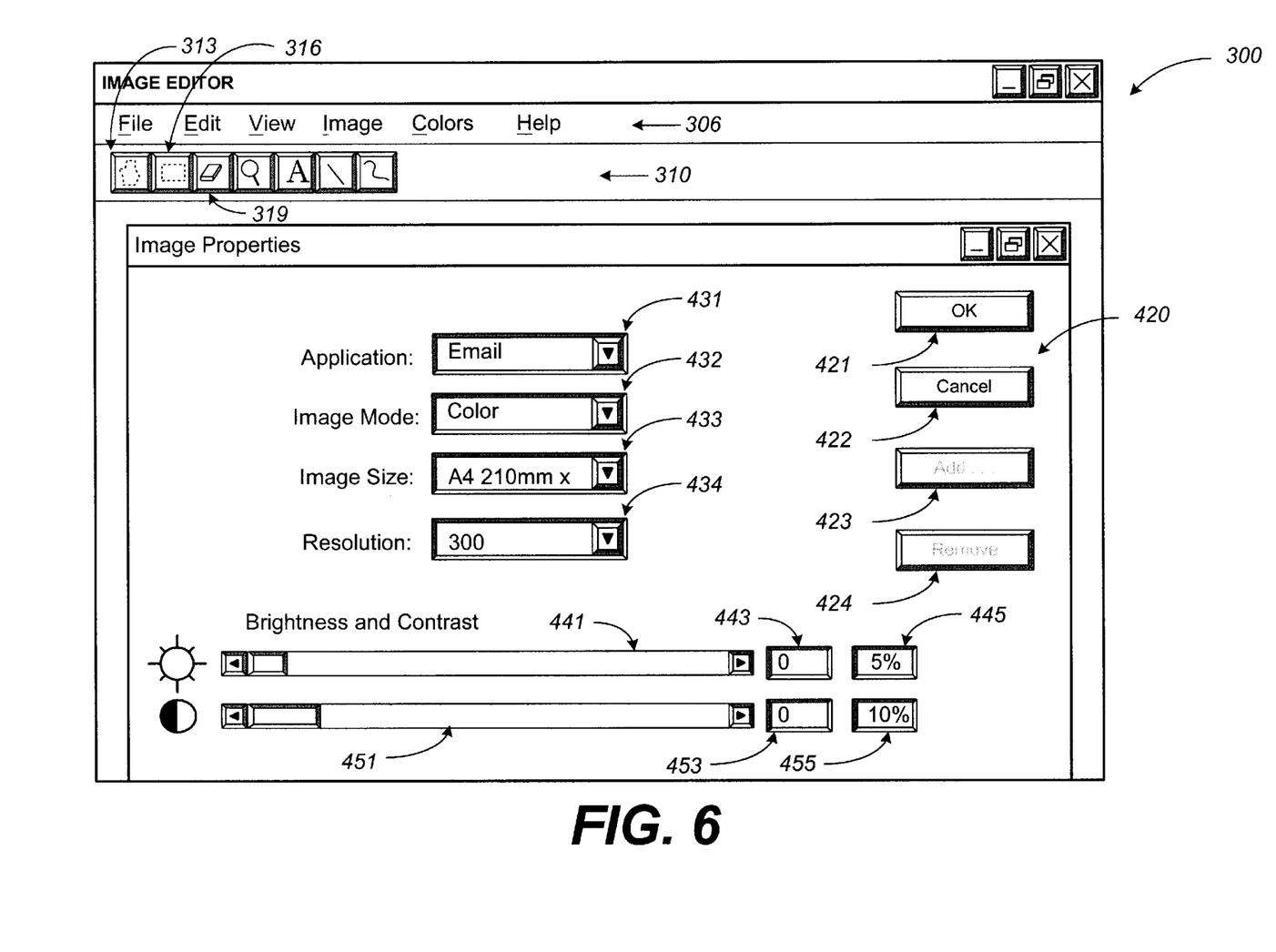
FIG. 6 is a schematic diagram of an embodiment of the GUI of FIG. 4 that has been modified in response to a visual-acuity test result.

In this regard, FIG. 5 presents a schematic diagram of an exemplary visual-acuity test display that is generated using a different processing parameter value than the display of FIG. 3. Despite the fact that the images presented have been generated using different contrast parameter values, the resulting images may appear so similar that any further reduction in the contrast parameter sensitivity would render subsequent images that would also appear to be similar to the images in FIG. 5 to an operator of the image editor. Once the visual-acuity test has reached this point in the test process, the operator may be instructed to select the "No Change" pushbutton 325 on the popup window display 320. In response, the image editor 100 may be configured to apply the last delta associated with the last set of generated test images where the operator affirmatively responded that the images were different. For example, the image editor 100 may be configured to adjust the contrast sensitivity control 451 on the image-processing interface pop-up 420 such that the contrast sensitivity is no finer than 10% of the full range of the digital contrast control.

Concurrently, with the image-processing interface pop-up adjustment, the image editor 100 may be configured to present the first stage of another visual-acuity test associated with a separate image-editing control. The examples of FIGS. 3 to 6 illustrate the situation where a single image-editing parameter is adjusted in association with a visual-acuity test. It should be appreciated that those skilled in testing the abilities of the human eye may devise test images capable of exercising one or more image-editing control parameters. Any such test image is deemed within the scope of the improved image editor 100.

Figure 7:
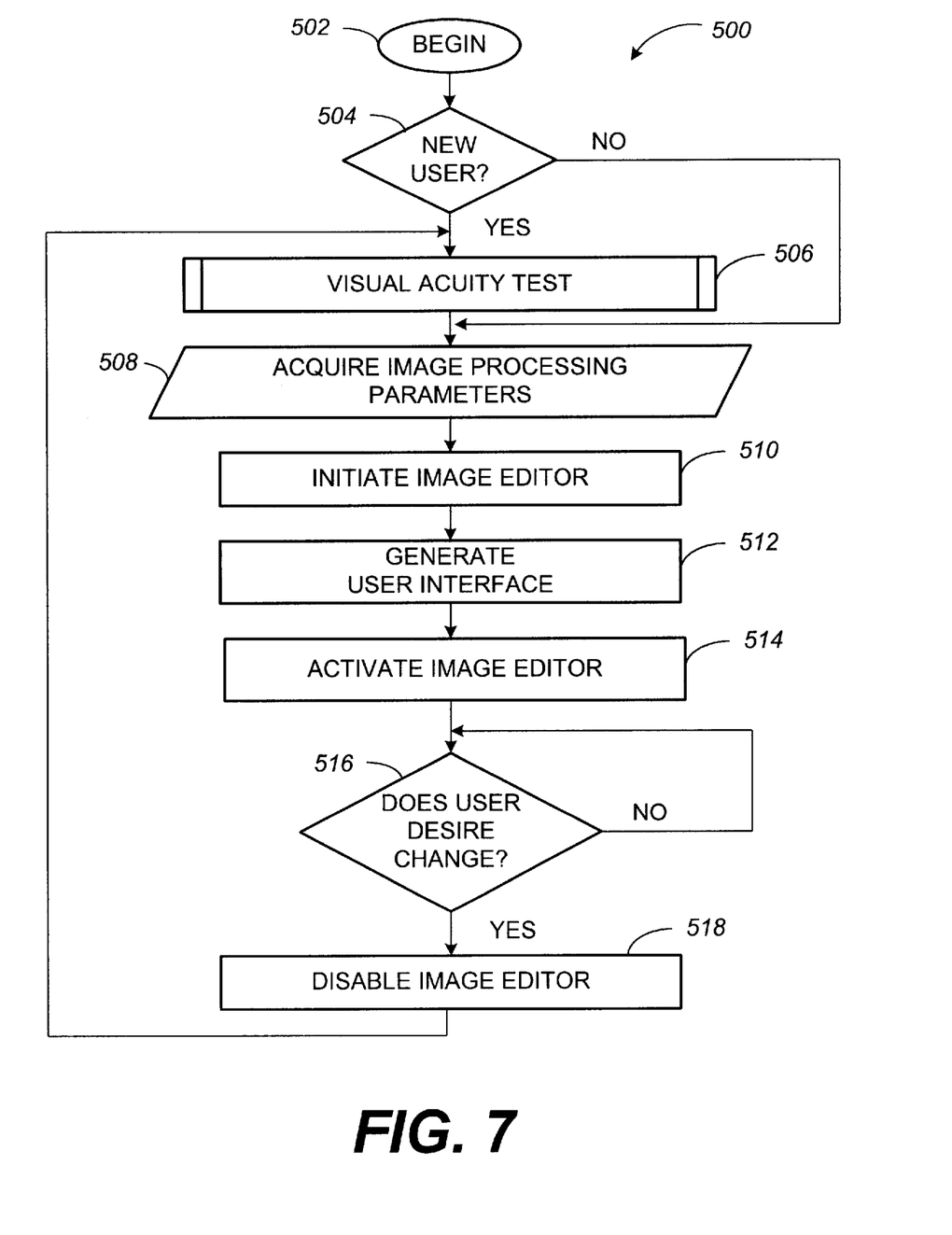
FIG. 7 is a flow chart illustrating a method for updating a GUI in accordance with one or more visual-acuity tests that may be practiced by the image-processing system of FIG. 1.

Reference is now directed to FIG. 7 which presents a flowchart highlighting a method for updating a GUI in accordance with one or more visual-acuity tests that may be practiced by the image-processing system of FIG. 1. In this regard, the method for updating a GUI 500 may begin with step 502, labeled, "BEGIN." First, a query may be presented to determine if the operator is new to the image-editing application or if the operator has previously been visually tested as indicating in the query of step 504. If the response to the query of step 504 is affirmative, the method for updating a GUI 500 may be configured to perform one or more visual-acuity tests 506 via the image editor 100 (FIGS. 1 and 2). After performing the one or more visual-acuity tests in step 506, the method for updating a GUI 500 may proceed by acquiring image-processing sensitivity parameters as determined by the one or more visual-acuity tests as indicated in step 508.

Next, the method for updating a GUI 500 may be configured to initiate the image-editor application 100 as illustrated in step 510. It should be appreciated that an important sub-step of the initialization process of the image editor 100 is the application of the image-processing sensitivity parameters acquired in step 508 as is indicated in step 512. Next, in step 514 the image editor 100 may enter one or more image-editing modes such that an operator may apply image-processing parameters having an appropriate sensitivity that permits each image-editing change request to result in a change in the modified image that is visibly discernible by an operator of the image editor 100.

As illustrated in the flowchart of FIG. 7, the image editor 100 may be configured with one or more triggers that may initiate the query as illustrated in step 516. If an operator indicates that a change is necessary to one or more of the image-editing control sensitivities as indicated by the flow control arrow labeled, "YES," the method for updating a GUI 500 may be configured to perform step 518, where the image editor is temporarily disabled and to return to the visual-acuity test(s) of step 506. Otherwise, the image editor 100 may remain indefinitely in an image-editing mode as indicated by the flow control arrow labeled, "NO" that exits the query of step 516. It will be appreciated that the method for updating a GUI 500 may repeat steps 514 and 516 as long as an operator desires to actively edit images with the underlying image editor 100. It should also be appreciated that step 518 and steps 506 through 512 may be repeated as often as a particular user desires. In an alternative embodiment, step 518 and steps 506 through 512 may be performed if a separate user having a different visual acuity than a first user were to begin using the image editor 100.

Figure 8:
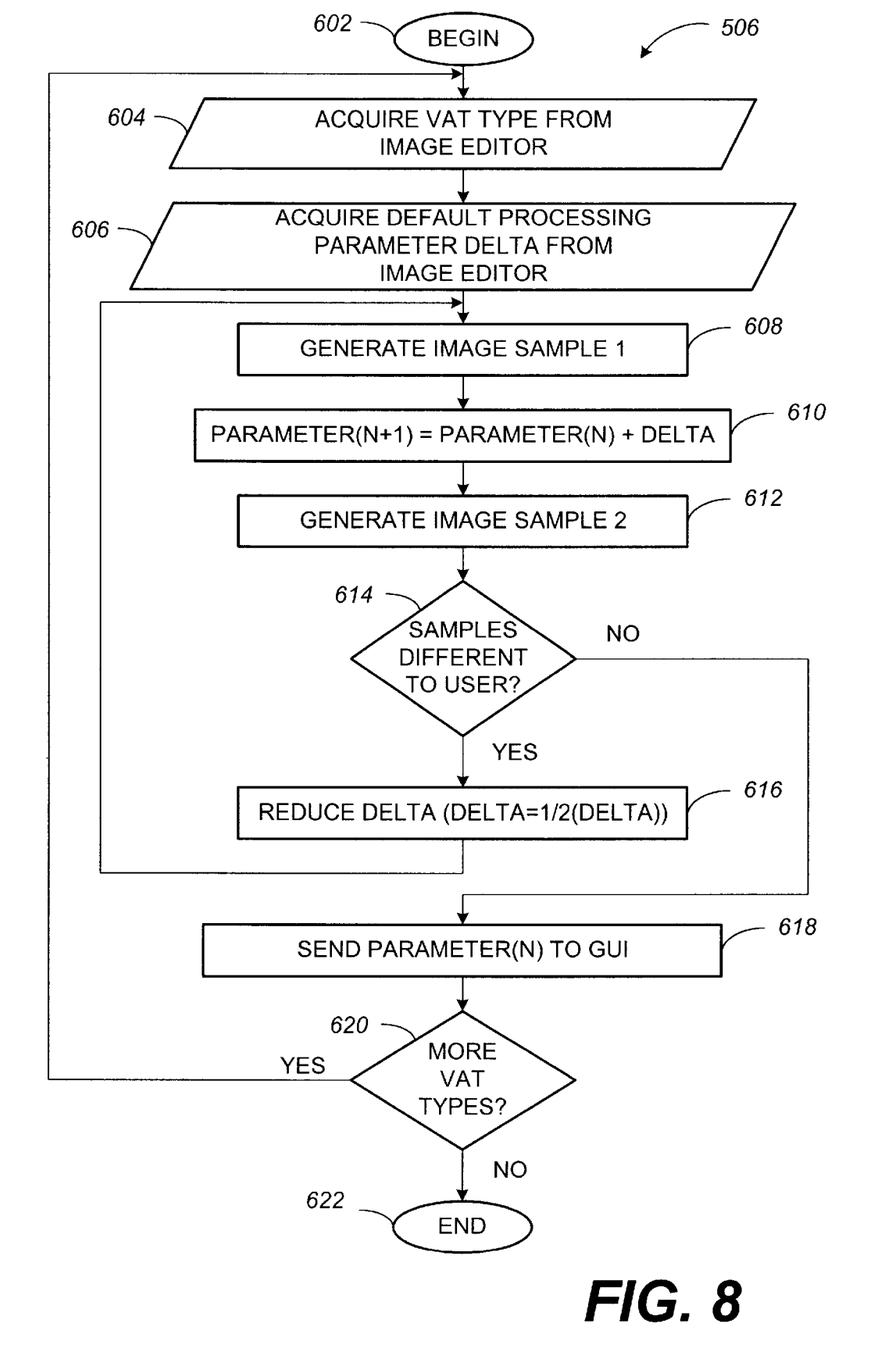
FIG. 8 is a flow chart illustrating a method for updating image-processing parameters that may be practiced by the image-processing system of FIG. 1.

Reference is now directed to FIG. 8, which further illustrates the visual-acuity test of step 506 in the method for updating a GUI 500 presented in the flowchart of FIG. 7. In this regard, the flowchart of FIG. 8 presents a method for updating image-processing sensitivity values that may be practiced by the image-processing system of FIG. 1. The method for updating image-processing sensitivity values 506 may begin with step 602, labeled, "BEGIN." First, the method may be configured to acquire a particular visual-acuity test type as illustrated in step 604. Next, the method for updating image-processing sensitivity values 506 may be configured to acquire a default processing parameter from the image editor 100 (FIGS. 1 and 2) as shown in step 606. As illustrated in step 608, the method for updating image-processing sensitivity values 506 may be configured to generate a first test image using the default processing parameter provided by the image editor 100. Next, the method for updating image-processing sensitivity values 506 may calculate an appropriate image-processing control parameter to use in generating a second test image. As illustrated in step 610, a predetermined delta may be added to the default image-processing value. Step 612 then reflects the application of the "shifted" image-processing parameter value in generating the second test image.

The method for updating image-processing sensitivity values 506 having generated sample test images with at least one image-processing variable that varies by a known delta, the sample images may be presented to the operator to determine as indicated in the query of step 614 if the operator can detect that the sample images are different. If the response to query of step 614 is affirmative (i.e., the operator can detect that the sample images are different), the method for updating image-processing sensitivity values 506 may be configured to perform step 616 where the present delta is reduced. As illustrated, the method for updating image-processing sensitivity values 506 may then repeat step 616 and steps 608 through 614 as required until the operator of the image editor 100 can no longer detect a difference in the sample images.

As illustrated in the flowchart of FIG. 8, once the operator of the image editor 100 can no longer detect a difference in the sample images, the method for updating image-processing sensitivity values 506 may be configured to perform step 618 where the last sensitivity control parameter that resulted in an operator detectable difference in the sample images may be forwarded to the GUI 110 of the image editor 100. Next, a determination may be made if further visual-acuity tests are to be performed as indicated in the query of step 620. If the response to the query of step 620 is affirmative, the method for updating image-processing sensitivity values 506 may be configured to repeat steps 604 through 620 until all tests have been performed. Otherwise, if the query of step 620 results in a negative response, the method for updating image-processing sensitivity values 506 may be configured to terminate as indicated in step 622, labeled, "END." It should be appreciated that the image editor 100 may be configured with one or more triggers that may permit an operator of the image editor 100 to abort and/or exit the visual-acuity tests. Those skilled in the art can add this functionality as desired by the particular image-editing application.

Process descriptions or blocks in the flow charts of FIGS. 7 and 8 should be understood to represent modules, segments, or portions of code which include one or more executable instructions for implementing specific logical functions or steps in the various methods described. Alternate implementations are included within the scope of the preferred embodiment of the image editor 100 in which functions may be executed out of order from that shown or discussed, including substantially concurrently or in reverse order, depending on the functionality involved, as would be understood by those reasonably skilled in the art of the present invention. For example, as described above, it is contemplated that the various visual-acuity tests disclosed above may be integrated within an image editor software application. It will be appreciated by those skilled in the art that the visual-acuity tests may be separated and performed in accordance with a distinct software application which may store a data file which may be accessed by a separate and distinct image-editing application program. Those skilled in the art will be able to make the aforementioned adjustments to the executable code and the methods disclosed above without undue experimentation.

What is claimed is:

1. A method for updating image-processing control parameters associated with an image-editing system, comprising:

identifying when a new operator is active on the image-editing system;

presenting at least one visual-acuity tests to the operator, wherein the visual-acuity test determines at least one image-processing control parameter sensitivity value that when applied in the image-editing system results in a modified image that is perceivably different as viewed by the operator; and replacing the at least one image-processing control parameter sensitivity value.

2. The method of claim 1, wherein the step of identifying is replaced by:

responding to an operator request to modify at least one image-editing control parameter sensitivity value.

3. The method of claim 1, wherein the step of identifying comprises determining if an operator specific data file associated with the present operator exists.

4. The method of claim 3, wherein the operator specific data file comprises at least one image-processing control-parameter sensitivity delta.

5. The method of claim 1, wherein the at least one image-editing control parameter is selected from the group consisting of color hue, saturation, and luminance.

6. The method of claim 1, wherein the at least one image-editing control parameter is selected from the group consisting of highlight, mid-tone, and shadow.

7. The method of claim 1, wherein the at least one image-editing control parameter is selected from the group consisting of brightness and contrast.

8. The method of claim 1, further comprising:

permitting an operator of the image-editing system to override at least one image-editing control-parameter sensitivity value when an operator so desires.

9. A method for updating image-processing control parameters associated with an image editor, comprising:

generating a first image and a second image, the images generated in response to a change in at least one image-processing control parameter;

presenting the first and second images to an operator of the image editor;

prompting the operator if the first and second images are different;

responding when the first and second images are indicated by the operator as different by reducing a delta defined by the difference between the at least one image-processing control parameter used to generate the first and second images respectively;

repeating the generating, presenting, prompting and responding steps until the operator can no longer detect a difference in the first and second images; and forwarding the last detectable image-processing control parameter delta to the image editor.

10. The method of claim 9, wherein the image-processing control parameter has been changed by a predetermined value.

11. The method of claim 9, wherein responding comprises reducing the delta by one-half of the present delta.

12. The method of claim 11, further comprising returning to the previous delta that resulted in a discernable difference between the first and second images and reducing the delta by one-fourth of the present delta when the reduction by one-half of the present delta results in a first and second images that do not contain a discernable difference.

13. A computer based image-processing system, comprising:

means for acquiring at least one image-processing control parameter;

means for applying a default sensitivity value to the at least one image-processing control parameter;

means for presenting at least visual-acuity test to an operator of the image-processing system; and means for selectively adjusting the default sensitivity value associated with the at least one image-processing control parameter in response to the at least one visual-acuity test.

14. The system of claim 13, wherein the applying means is responsive to a default sensitivity delta associated with the visual acuity of at least a majority of the population at large when the at least one image-processing control parameter is used to generate a first sample image and a combination of the at least one image-processing control parameter and the default sensitivity delta is used to generate a second sample image, wherein the majority of the population can discern a difference between the first and second sample images.

15. The system of claim 13, wherein the presenting means comprises a graphical user interface (GUI) in association with image-processing system.

16. The system of claim 13, wherein the acquiring, applying, and selectively adjusting means comprise a computer associated with a display configured to present a graphical user interface (GUI).

17. An image-processing system, comprising:

an image acquisition device;

a processor in communication with the image acquisition device and a memory device, the memory device containing image-processing logic, user interface logic, and visual acuity logic, wherein the visual acuity logic generates and presents at least a first image and a second image, the images generated in response to a change in at least one image-processing control parameter;

a user-interface device in communication with the processor via the user interface logic, wherein the user interface logic is modified in response to an operator's ability to observe a difference between the first and second images; and a display device in communication with the processor configured to present a graphical user interface comprising the first and second images.

18. The system of claim 17, wherein the modification in the user interface logic comprises adjusting an image-processing control parameter sensitivity value.

19. The system of claim 18, wherein the modification can be selectively superseded by an operator of the image-processing system.

20. A computer readable medium, comprising:

logic configured to obtain at least one default image-processing control parameter sensitivity value and an associated sensitivity delta;

logic configured to apply the at least one default sensitivity value to generate a first image and to apply a combination of the at least one default sensitivity value and the associated sensitivity delta to generate a second image;

logic configured to display the first and second images;

logic configured to reduce the associated sensitivity delta until an observer can no longer observe a difference between the first and second images; and logic responsive to the logic for reducing configured to update the associated sensitivity delta.

* * * * *